Patented July 4, 1944

2,352,944

UNITED STATES PATENT OFFICE 2,352,944

TRIAZOLE DERIVATIVES

Gaetano F. D'Alelio, Pittsfield, Mass., assignor to General Electric Company, a corporation of New York No Drawing. Application July 4, 1942,
Serial No. 449,787

16 Claims. (Cl. 260—308)

This invention relates to new chemical compounds and more particularly to triazole derivatives. The invention especially is concerned with the production of new and useful 1-carbamyl, -thiocarbamyl and -guanyl (-iminocarbamyl) triazoles. The chemical compounds of this invention may be represented by the following general formula:

I 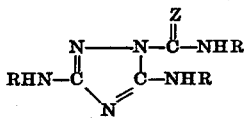

where R represents a member of the class consisting of hydrogen and monovalent hydrocarbon radicals, and Z represents a member of the class consisting of oxygen and sulfur atoms and the imino (=NH) radical.

This application is a continuation-in-part of my copending applications Serial No. 415,938, filed October 21, 1941, Serial No. 428,586, filed January 28, 1942, and Serial No. 435,344, filed March 19, 1942, now Patent No. 2,320,820, issued June 1, 1943. All of these applications are assigned to the same assignee as the present invention.

Illustrative examples of monovalent hydrocarbon radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); and aryl-substituted aliphatic (e. g., benzyl, cinnamyl, phenylethyl, phenylpropyl, phenylisopropyl, etc.). Preferably R in Formula I is hydrogen.

The new compounds of this invention may be used, for example, as pharmaceuticals, plasticizers and as intermediates in the preparation of derivatives thereof, e. g., methylol, methylene, etc., derivatives of the individual compound embraced by Formula I. My new compounds are especially valuable in the preparation of synthetic resinous compositions. Thus, they may be condensed with, for instance, aldehydes, including polymeric aldehydes, hydroxyaldehydes and aldehyde-addition products, to yield condensation products of particular utility in the plastics and coating arts. Such condensation products are more fully described and are specifically claimed in my copending application Serial No. 449,165, filed June 30, 1942, and assigned to the same assignee as the present invention.

Various methods may be employed to produce the chemical compounds of this invention. For example, the 1-carbamyl, 1-thiocarbamyl and 1-guanyl guanazoles embraced by Formula I can be prepared by effecting reaction between dicyandiamide (cyanoguanidine) and a semicarbazide. This reaction advantageously may be carried out in an aqueous medium and preferably in the presence of one mol of inorganic acid (e. g., hydrochloric, hydrobromic, phosphoric, sulfuric, etc.) for each mol of the semicarbazide. The acid may be present in the form of an inorganic acid mono salt of the semicarbazide. This reaction may be represented by the following general equation, where Z and R have the same meanings as given above with reference to Formula I:

II 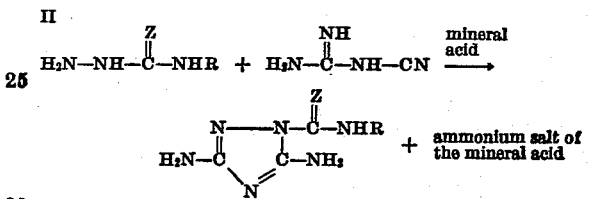

Another suitable method of preparing the 1-carbamyl, 1-thiocarbamyl and 1-guanyl guanazoles embraced by Formula I comprises effecting reaction between biguanide (guanyl guanidine) and a semicarbazide. In this case it is preferable either to use two mols of inorganic acid for each mol of semicarbazide or to use the inorganic acid mono salt of both the biguanide and the semicarbazide, since two mols of ammonia will be liberated. This reaction may be represented by the following general equation, where Z and R have the same meanings as given above with reference to Formula I:

III 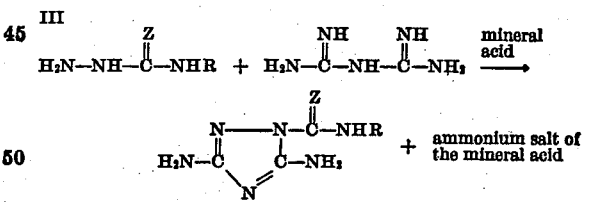

From the foregoing description of the methods represented by Equations II and III it will be seen that my invention provides a method of preparing, for example, 1-carbamyl guanazole which comprises effecting reaction between approximately equimolecular proportions of an inorganic acid mono salt of semicarbazide, specifically semicarbazide monohydrochloride, and a substituted guanidine selected from the class consisting of cyanoguanidine and guanyl guanidine. My invention also provides a method of preparing, for example, 1-carbamyl guanazole which comprises effecting reaction between approximately equimolecular proportions of an inorganic acid mono salt of semicarbazide, more particularly semicarbazide monohydrochloride, and an inorganic acid mono salt of guanyl guanidine, specifically the monohydrochloride of guanyl guanidine.

Another method of preparing the 1-guanyl 1,2,4-triazoles (1-iminocarbamyl guanazoles) comprises effecting reaction between a cyanamide and a guanazole. This reaction may be represented by the following general equation:

$$\text{IV} \quad \underset{RHN-C}{\overset{N\text{——}N-H}{\underset{\diagdown N \diagup}{\|}}}C-NHR + RHN-CN \longrightarrow \underset{RHN-C}{\overset{N\text{——}N-\overset{NH}{\overset{\|}{C}}-NHR}{\underset{\diagdown N \diagup}{\|}}}C-NHR$$

where R has the same meaning as given above with reference to Formula I.

The reactions represented by Equations II, III and IV preferably are carried out in aqueous solution at the reflux or boiling temperature of the reaction mixture and at atmospheric pressure. Generally speaking, any temperature that is sufficient to cause the reactions represented by Equations II to IV, inclusive, to proceed without substantial loss of reactants may be employed. Instead of carrying out the described reactions at atmospheric pressure, the reactions may be effected under sub-atmospheric or super-atmospheric pressures if desired.

Illustrative examples of semicarbazides that may be used, depending upon the particular end-product desired, in practicing the methods represented by Equations II and III are listed below:

Semicarbazide
Thiosemicarbazide
Iminosemicarbazide (aminoguanidine)
4-methyl semicarbazide
4-methyl thiosemicarbazide
4-methyl iminosemicarbazide
4-ethyl semicarbazide
4-propyl thiosemicarbazide
4-ethyl iminosemicarbazide
4-propyl iminosemicarbazide
4-phenyl semicarbazide
4-hexyl thiosemicarbazide
4-phenyl thiosemicarbazide
4-phenyl iminosemicarbazide
4-pentyl iminosemicarbazide
4-butyl semicarbazide
4-isobutyl semicarbazide
4-allyl semicarbazide
4-methallyl semicarbazide
4-allyl thiosemicarbazide
4-propenyl semicarbazide
4-allyl iminosemicarbazide
4-tolyl semicarbazide
4-tolyl thiosemicarbazide
4-xylyl thiosemicarbazide
4-(phenethyl) semicarbazide
4-(ethylphenyl) semicarbazide
4-cyclopentyl semicarbazide
4-cyclohexyl semicarbazide
4-cyclohexenyl semicarbazide
4-octyl semicarbazide The above numbering of the specified semicarbazides is in accordance with the numbering system approved by the American Chemical Society, that is, $$\text{V} \quad \overset{1}{NH_2}-\overset{2}{NH}-\overset{3}{\underset{\|}{C}}-\overset{4}{NH_2}$$
$$\quad\quad\quad\quad\quad\quad Z$$

Illustrative examples of cyanamides that may be used in carrying out the method represented by Equation IV, the chosen cyanamide depending upon the particular end-product sought, are:

Cyanamide
Methyl cyanamide
Ethyl cyanamide
Propyl cyanamide
Butyl cyanamide
Isobutyl cyanamide
Allyl cyanamide
Propenyl cyanamide
Cyclopentyl cyanamide
Phenyl cyanamide
Tolyl cyanamide
Xylyl cyanamide
Naphthyl cyanamide
Ethylphenyl cyanamide
Phenethyl cyanamide
Allylphenyl cyanamide
Propenylphenyl cyanamide
Octyl cyanamide Illustrative examples of diamino [(—NHR)$_2$] 1,2,4-triazoles that may be employed, depending upon the particular end-product desired, in practicing the methods represented by Equation IV are listed below:

Guanazole (3,5-diamino 1,2,4-triazole)
3,5-di-(methylamino) 1,2,4-triazole
3,5-di-(ethylamino) 1,2,4-triazole
3,5-di-(butylamino) 1,2,4-triazole
3,5-di-(cyclopentylamino) 1,2,4-triazole
3,5-di-(propylamino) 1,2,4-triazole
3,5-di-(isobutylamino) 1,2,4-triazole
3,5-di-(allylamino) 1,2,4-triazole
3,5-di-(propenylamino) 1,2,4-triazole
3,5-di-(pentylamino) 1,2,4-triazole
3,5-di-(octylamino) 1,2,4-triazole
3,5-di-(cycloheptylamino) 1,2,4-triazole
3-methylamino 5-amino 1,2,4-triazole
3-ethylamino 5-amino 1,2,4-triazole
3-isobutylamino 5-methylamino 1,2,4-triazole
3-anilino 5-amino 1,2,4-triazole
3,5-dianilino 1,2,4-triazole
3-anilino 5-methylamino 1,2,4-triazole
3,5-ditoluido 1,2,4-triazole
3,5-dixylidino 1,2,4-triazole
3-allylamino 5-amino 1,2,4-triazole
3-cyclohexenylamino 5-amino 1,2,4-triazole
3,5-di-(phenethylamino) 1,2,4-triazole
3,5-di-(ethylphenylamino) 1,2,4-triazole
3,5-di-(naphthylamino) 1,2,4-triazole In order that those skilled in the art better may understand how the present invention may be carried into effect, the following examples are given by way of illustration and not by way of limitation. All parts are by weight.

*Example 1*

This example illustrates the preparation of 1-carbamyl guanazole (1-carbamyl 3,5-diamino 1,2,4-triazole), the formula for which is VI
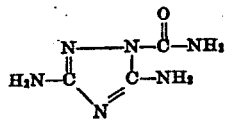

| | Parts |
|---|---|
| Semicarbazide hydrochloride | 109 |
| Dicyandiamide | 84 |

The above ingredients were dissolved in 150 parts water. The resulting solution was heated under reflux at boiling temperature for 2 hours. After refluxing for 20 minutes, the solution became cloudy and heavy precipitation followed. The precipitate comprising 1-carbamyl guanazole was filtered off while hot and then was washed to free it of soluble salts. The washed 1-carbamyl guanazole was dried at 60° C. When a sample of the purified material was heated on a spatula, it did not melt but sublimed with decomposition. It was insoluble in boiling water, alcohol, chloroform, ether, dioxane and ethylene glycol monoethyl ether. When heated with formaldehyde, a resinous condensation product was obtained.

Instead of using a preformed inorganic acid mono salt of the semicarbazide, specifically semicarbazide monohydrochloride, as a starting reactant, the semicarbazide itself may be employed and the reaction carried out in the presence of an inorganic (mineral) acid, specifically hydrochloric acid, in equal molar amount with the amount of semicarbazide used.

*Example 2*

1-thiocarbamyl guanazole is prepared in essentially the same manner as described under Example 1 with reference to the production of 1-carbamyl guanazole with the exception that, instead of semicarbazide monohydrochloride, an equivalent amount of thiosemicarbazide monohydrochloride is used.

*Example 3*

1-guanyl guanazole (1-iminocarbamyl guanazole) is produced in essentially the same manner as described under Example 1 with reference to the preparation of 1-carbamyl guanazole with the exception that, instead of semicarbazide monohydrochloride, an equivalent amount of aminoguanidine (iminosemicarbazide) monohydrochloride is employed.

Other examples of compounds embraced by Formula I and which are illustrative of the new chemical compounds of the present invention are mentioned below:

1-methylcarbamyl 3,5-diamino 1,2,4-triazole
1-ethylthiocarbamyl 3,5-diamino 1,2,4-triazole
1-methylguanyl 3,5-diamino 1,2,4-triazole
1-allylcarbamyl 3,5-diamino 1,2,4-triazole
1-propenylthiocarbamyl 3,5-diamino 1,2,4-triazole
1-cyclohexylcarbamyl 3,5-diamino 1,2,4-triazole
1-propylcarbamyl 3,5-diamino 1,2,4-triazole
1-isobutylcarbamyl 3,5-diamino 1,2,4-triazole
1-pentylcarbamyl 3,5-diamino 1,2,4-triazole
1-hexylthiocarbamyl 3,5-diamino 1,2,4-triazole
1-carbamyl 3-methylamino 5-amino 1,2,4-triazole
1-thiocarbamyl 3,5-di-(methylamino) 1,2,4-triazole
1-carbamyl 3,5-di-(ethylamino) 1,2,4-triazole
1-carbamyl 3,5-di-(propylamino) 1,2,4-triazole
1-carbamyl 3,5-di-(isobutylamino) 1,2,4-triazole
1-carbamyl 3,5-di-(cyclohexylamino) 1,2,4-triazole
1-carbamyl 3,5-dianilino 1,2,4-triazole
1-carbamyl 3,5-ditoluido 1,2,4-triazole
1-guanyl 3,5-di-(propylamino) 1,2,4-triazole
1-thiocarbamyl 3,5-di-(allylamino) 1,2,4-triazole
1-carbamyl 3,5-dixylidino 1,2,4-triazole
1-thiocarbamyl 3,5-di-(hexylamino) 1,2,4-triazole
1-carbamyl 3,5-di-(phenethylamino) 1,2,4-triazole
1-carbamyl 3,5-di-(ethylphenylamino) 1,2,4-triazole
1-thiocarbamyl 3,5-dianilino 1,2,4-triazole
1-guanyl 3,5-dianilino 1,2,4-triazole
1-guanyl 3-ethylamino 5-amino 1,2,4-triazole
1-carbamyl 3-amino 5-propylamino 1,2,4-triazole
1-thiocarbamyl 3-allylamino 5-benzylamino 1,2,4-triazole
1-propylcarbamyl 3-ethylamino 5-phenethylamino 1,2,4-triazole
1-allylguanyl 3,5-diamino 1,2,4-triazole
1-guanyl 3-butylamino 5-cyclohexylamino 1,2,4-triazole
1-thiocarbamyl 3-cycloheptylamino 5-anilino 1,2,4-triazole
1-carbamyl 3,5-di-(octylamino) 1,2,4-triazole
1-thiocarbamyl 3,5-di-(propenylamino) 1,2,4-triazole
1-carbamyl 3,5-di-(naphthylamino) 1,2,4-triazole In a manner similar to that described above with particular reference to the production of the 1-carbamyl, 1-thiocarbamyl and 1-guanyl derivatives of the 1,2,4-triazoles, corresponding derivatives of the 1,2,3-triazoles, of the 1,2,5-triazoles and of the 1,3,4-triazoles may be prepared.

What I claim as new and desire to secure by Letters Patent of the United States is:

1. Chemical compounds corresponding to the general formula

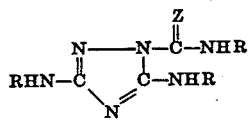

where R represents a member of the class consisting of hydrogen and monovalent hydrocarbon radicals, and Z represents a member of the class consisting of oxygen and sulfur atoms and the imino radical.

2. Chemical compounds as in claim 1 wherein R represents hydrogen.

3. Chemical compounds as in claim 1 wherein Z represents oxygen.

4. 1-carbamyl guanazole.

5. Chemical compounds as in claim 1 wherein Z represents sulfur.

6. 1-thiocarbamyl guanazole.

7. Chemical compounds as in claim 1 wherein Z represents the imino radical.

8. 1-guanyl guanazole.

9. The method of preparing chemical compounds corresponding to the general formula

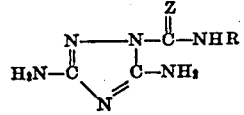

where R represents a member of the class consisting of hydrogen and monovalent hydrocarbon radicals, and Z represents a member of the class consisting of oxygen and sulfur atoms and the imino radical, said method comprising effecting reaction under acidic conditions between (1) a semicarbazide corresponding to the general formula $$H_2N-NH-\overset{Z}{\underset{\|}{C}}-NHR$$

where R and Z have the meanings above given, and (2) a substituted guanidine selected from the class consisting of cyanoguanidine and guanyl guanidine.

10. A method as in claim 9 wherein R represents hydrogen and the reaction is carried out in the presence of an inorganic acid.

11. A method as in claim 9 wherein R represents hydrogen and the semicarbazide is used in the form of an inorganic acid mono salt thereof.

12. The method of preparing 1-carbamyl guanazole which comprises effecting reaction between approximately equimolecular proportions of (1) an inorganic acid mono salt of semicarbazide and (2) a substituted guanidine selected from the class consisting of cyanoguanidine and guanyl guanidine.

13. The method of preparing 1-carbamyl guanazole which comprises effecting reaction between approximately equimolecular proportions of (1) an inorganic acid mono salt of semicarbazide and (2) cyanoguanidine.

14. A method as in claim 13 wherein the inorganic acid mono salt is semicarbazide monohydrochloride.

15. The method of preparing 1-carbamyl guanazole which comprises effecting reaction between approximately equimolecular proportions of an inorganic acid mono salt of semicarbazide and an inorganic acid mono salt of guanyl guanidine.

16. A method as in claim 15 wherein both inorganic acid mono salts are the monohydrochlorides.

GAETANO F. D'ALELIO.

Disclaimer 2,352,944.—*Gaetano F. D'Alelio*, Pittsfield, Mass. TRIAZOLE DERIVATIVES. Patent dated July 4, 1944. Disclaimer filed May 12, 1948, by the assignee, *General Electric Company*.

Hereby disclaims claims 7 and 8 of said patent and so much of claim 1 as covers compounds in which Z represents the imino radical.

[*Official Gazette June 15, 1948.*]